No. 735,949. PATENTED AUG. 11, 1903.
J. M. CONROY.
MACHINE FOR ORNAMENTING GLASS.
APPLICATION FILED DEC. 31, 1902.

NO MODEL. 2 SHEETS—SHEET 1.

WITNESSES: Herbert Bradley. F. E. Gaither.

INVENTOR John M. Conroy by Daniel B. Wolcott Att'y.

No. 735,949. PATENTED AUG. 11, 1903.
J. M. CONROY.
MACHINE FOR ORNAMENTING GLASS.
APPLICATION FILED DEC. 31, 1902.
NO MODEL. 2 SHEETS—SHEET 2.

WITNESSES:
Herbert Bradley.
F. E. Gaither.

INVENTOR
John M. Conroy
by Dammi & Wolcott Att'y.

No. 735,949. Patented August 11, 1903.

UNITED STATES PATENT OFFICE.

JOHN M. CONROY, OF ALLEGHENY, PENNSYLVANIA.

MACHINE FOR ORNAMENTING GLASS.

SPECIFICATION forming part of Letters Patent No. 735,949, dated August 11, 1903.

Application filed December 31, 1902. Serial No. 137,256. (No model.)

*To all whom it may concern:*

Be it known that I, JOHN M. CONROY, a citizen of the United States, residing at Allegheny, in the county of Allegheny and State of Pennsylvania, have invented or discovered certain new and useful Improvements in Machines for Ornamenting Glass, of which improvements the following is a specification.

The invention described herein relates to certain improvements in machines for shaping or producing an ornamental effect on the edges of glass articles, such as mirrors, &c., and has for its object a construction and combination of mechanical devices whereby portions of the edges may be broken away in such manner as to produce inclined scallops or indentations along the edge of the article, said scallops being at an angle less than a right angle with the surfaces of the article.

The invention is hereinafter more fully described and claimed.

Figure 1:
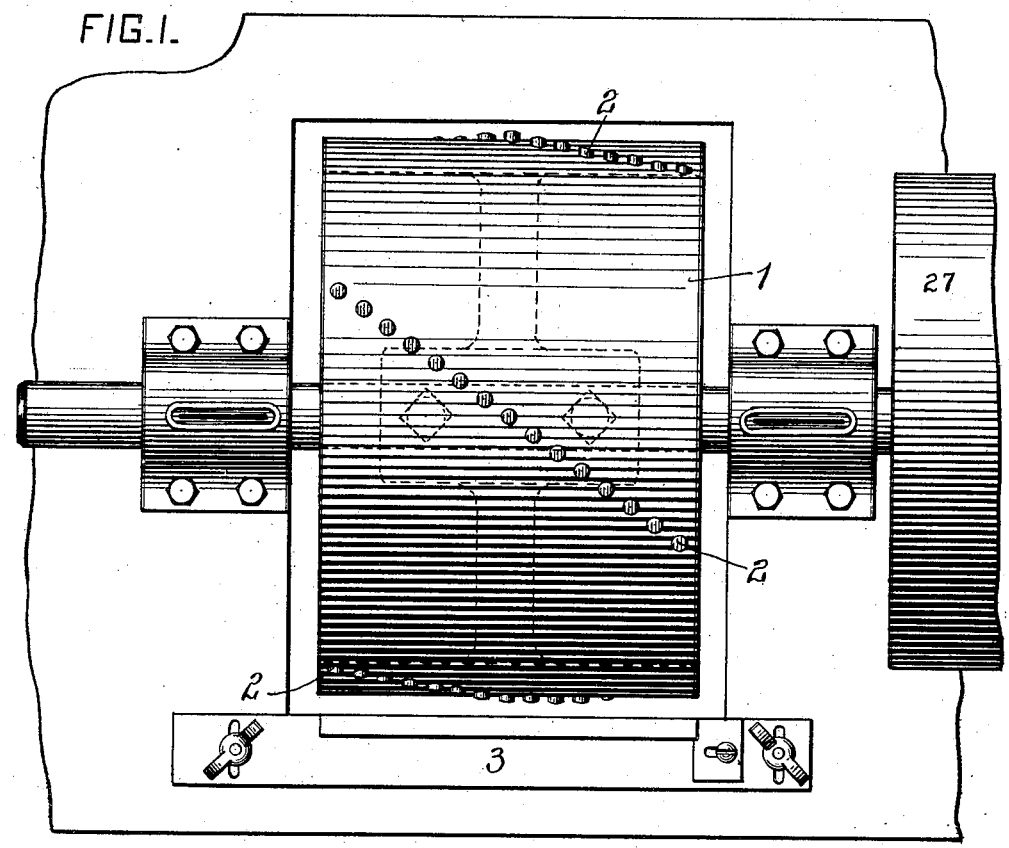
Figure 2:
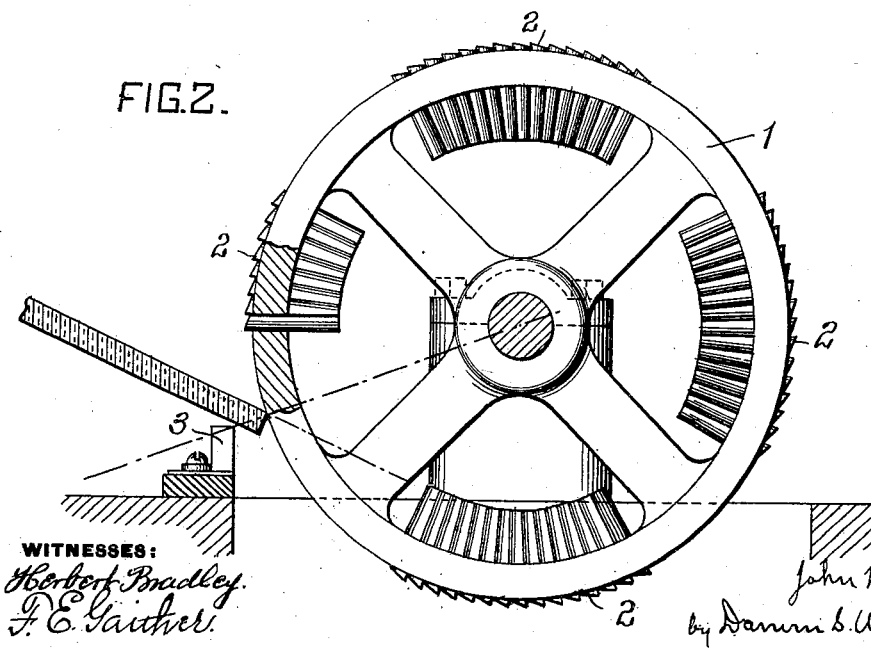
Figure 3:
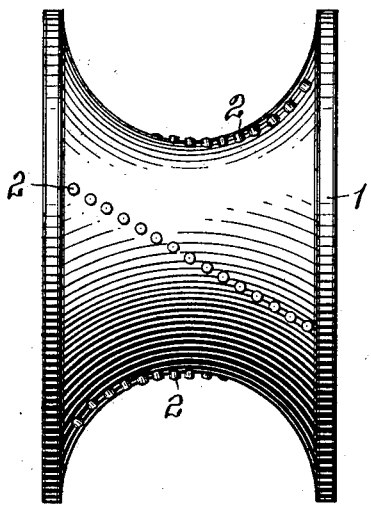
Figure 4:
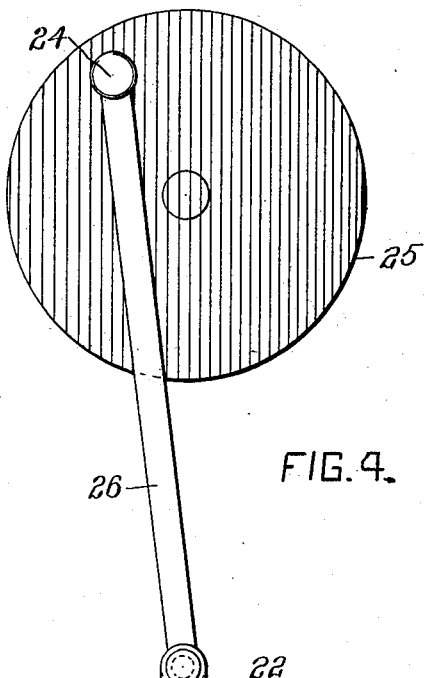
Figure 5:
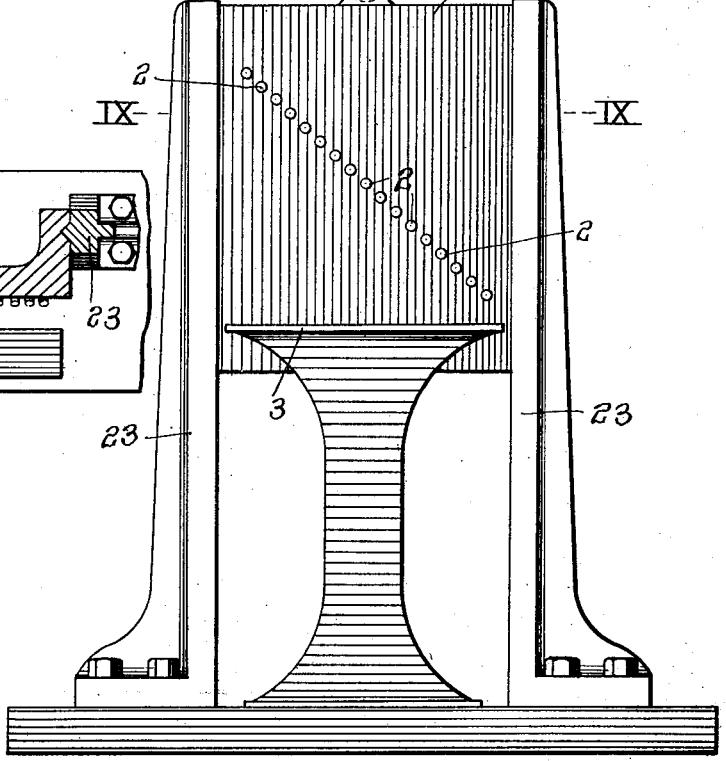

In the accompanying drawings, forming a part of this specification, Figure 1 is a plan view of a form of apparatus for the practice of my invention. Fig. 2 is a sectional elevation of the same. Fig. 3 is an elevation illustrating a modification in the shape of the drum. Fig. 4 is a view showing in elevation a further modification of my invention; and Fig. 5 is a sectional plan, the plane of section being indicated by the line IX IX, Fig. 4.

In Letters Patent dated March 17, 1902, No. 723,139, I have described and claimed a method of ornamenting glass which consists in striking the glass a sharp blow at a point adjacent to its edge, the direction of impact being at an angle to the surface of the article, and thereby breaking a piece of glass of such shape from the edge and opposite side of the article as to leave a scallop extending at an angle from the corner adjacent to which the blow was struck inward to a point some distance from the opposite corner. A series of scallops can be formed in like manner adjacent to each other, the width of the scallops being dependent upon the distance between the points at which the blows are struck. I have found that by evenly spacing the points of impact of the tool and making the blows uniform, or practically so, as to force that the pieces of glass removed are quite uniform in size and shape and that there is very little splintering of the glass. Except at and adjacent to the point of impact of the tool no sharp points or cutting edges are formed on the article, although such sharp points or edges are found in the pieces of glass removed.

In Figs. 1 and 2 I have shown my preferred form or construction of mechanism for ornamenting—e. g., scalloping—articles having straight edges. This construction consists of a carrier, which in this instance is made in the form of a rotating drum 1, driven by the pulley 27, mounted on the shaft of the drum, having a width of face at least equal to the length of the edge to be operated on, and one or more rows of pins 2 are secured in the periphery of the drum in such manner that the pins will strike successively on the article. The spacing of the pins around the periphery will be dependent upon the peripheral speed of the drum, or the speed of the drum is regulated in accordance with the spacing of the pins, so that an opportunity may be afforded for the recovery of the glass from the strains produced by one pin before being subjected to the action of another pin. The diameter or width of the pins and their spacing across the face of the drum is regulated by the width of the scallop to be formed. One or more rows or series of pins may be used if the drum is rotated slowly, so that a number of edges may be operated on during each revolution of the drum.

The rest bar or bearing 3 for the article is adjustably mounted on the frame of the machine and arranged preferably in such relation to the axis of the drums that the pins will be moving away from the bar or article resting thereon at the time of impingement on the article. I have found that it is desirable that the rest-bar should present a firm and uniform support for the glass to prevent breakage of the articles. The article is held by the operator in such position that the pins will strike on the article closely adjacent to the edge at an angle of about forty-five degrees to the upper surface of the article, as clearly shown in Fig. 2, and will move down and away from the article. In this movement the pin, which by preference should not strike much more than a one thirty-second of an inch from the edge of the article, does not merely nick the glass, but forces out a chip, the conoidal plane of fracture extending inwardly from the edge struck at an angle of about forty-five degrees to the opposite face of the article, as shown in Fig. 2. As before stated, the successive chips removed are substantially uniform in shape and size. In practice the operator presses the edge of the article against the periphery of the drum at the desired angle, the pins being set to project about a thirty-second of an inch from the periphery. It is preferred that the ends of the pins be beveled, as shown, to form a comparatively sharp striking edge and to permit the back edge of the pin to clear the edge of the article. The position of the bar or support 3 depends upon the thickness of the glass and should for best results be so adjusted that the line of support of the glass should coincide or be closely adjacent to the line where the plane of fracture intersects the under surface of the glass.

In Figs. 4 and 5 I have shown another form of mechanism for the practice of my invention, consisting of a reciprocating head 22, mounted in guides 23 and provided with a series of pins 2, arranged diagonally across the head, as shown. The reciprocation of the head can be effected by any suitable means—such, for example, as that shown, consisting of a pin 24, secured eccentrically to the disk 25 on a driven shaft and connected to the head by a pitman 26. The pins 2 are suitably spaced both longitudinally and transversely of the head to insure the desired successive blows on the glass, which while being operated on is supported by the rest bar or support 3.

As shown in Fig. 3, the periphery of the drum can be made to conform to the edge contour of the article.

I claim herein as my invention—

1. In a machine for shaping the edges of glass articles, the combination of a carrier having a series of two or more pins secured to the carrier and spaced in the direction and transversely of the path of movement of the carrier so as to operate successively and at different points on the article, means for moving the carrier and a rest or bearing arranged to support the article adjacent to the edges to be operated on, substantially as set forth.

2. In a machine for shaping the edges of glass articles, the combination of a drum provided with a series of pins spaced peripherally and transversely of the drum so as to operate successively and at different points on the article and a supporting-bar arranged to support the article adjacent to the edge to be operated on, substantially as set forth.

3. In a machine for shaping the edges of glass articles, the combination of a drum provided with a series of pins spaced both across and around the drum so as to operate successively and at different points on the article and a bar arranged to support the article along a line closely adjacent to the edge to be operated on, substantially as set forth.

4. In a machine for shaping the edges of glass articles, the combination of a carrier provided with a series of pins spaced in the direction and transversely of the path of movement of the carrier so as to operate successively and at different points on the article, said carrier having its face shaped to correspond with the edge of the article to be operated upon, and a rest or bearing corresponding to the contour of the edge of the article, and arranged to support the latter adjacent to its edge, substantially as set forth.

5. In combination with a support, a plurality of chipping-teeth, and means for operating the same successively.

6. In a device of the type set forth, a movable means carrying teeth arranged out of horizontal alinement with each other.

7. The combination with the support, of a plurality of teeth, and means for moving said teeth successively past said support.

In testimony whereof I have hereunto set my hand.

JOHN M. CONROY.

Witnesses:
DARWIN S. WOLCOTT,
F. E. GAITHER.